(12) United States Patent
Raha et al.

(10) Patent No.: US 12,475,644 B2
(45) Date of Patent: Nov. 18, 2025

(54) VIRTUAL HOLIDAY CONTROL

(71) Applicant: International Business Machines Corporation, Armonk, NY (US)

(72) Inventors: Amit Kumar Raha, Barrackpore (IN); Amitava Chakraborty, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 18/493,830

(22) Filed: Oct. 25, 2023

(65) Prior Publication Data

US 2025/0139881 A1    May 1, 2025

(51) Int. Cl.
    *G06T 17/00*    (2006.01)
    *G06F 3/01*    (2006.01)
    *G06Q 30/0601*    (2023.01)
    *G06Q 50/00*    (2024.01)

(52) U.S. Cl.
    CPC .............. *G06T 17/00* (2013.01); *G06F 3/011* (2013.01); *G06Q 30/0643* (2013.01); *G06Q 50/01* (2013.01)

(58) Field of Classification Search
    None
    See application file for complete search history.

(56) References Cited

U.S. PATENT DOCUMENTS

| 11,017,601 | B2 | 5/2021 | Kim |
| 11,120,616 | B2 | 9/2021 | Jiang et al. |
| 2011/0078052 | A1 | 3/2011 | Ciptawilangga |
| 2016/0210602 | A1* | 7/2016 | Siddique ................ G16H 10/60 |
| 2018/0255285 | A1 | 9/2018 | Hall et al. |
| 2019/0073831 | A1 | 3/2019 | Kim |
| 2020/0273253 | A1 | 8/2020 | Jadallah et al. |
| 2022/0100812 | A1* | 3/2022 | Anvaripour ......... G06F 16/9536 |
| 2024/0127543 | A1* | 4/2024 | Dessert .................. G06F 3/011 |
| 2024/0144413 | A1* | 5/2024 | Ishii ....................... G06Q 50/01 |
| 2024/0367795 | A1* | 11/2024 | Kasody ............. G06Q 30/0643 |

FOREIGN PATENT DOCUMENTS

| KR | 102314273 B1 | 10/2021 |
| RU | 2771098 C2 | 4/2022 |

OTHER PUBLICATIONS

Alexiei Dingli, "The Everyday Virtual Vacation: How to go on a global vacation from the comfort of your living room," https://becominghuman.ai/the-everyday-virtual-vacation-28f6923f0ea0 (retrieved Jul. 5, 2023), 13 pages.

(Continued)

*Primary Examiner* — Michael J Cobb
(74) *Attorney, Agent, or Firm* — CANTOR COLBURN LLP; Teddi Maranzano

(57) ABSTRACT

Techniques are provided for controlling virtual holiday experiences. In one embodiment, the techniques involve receiving a virtual itinerary, wherein the virtual itinerary includes a virtual holiday destination and a user preference, retrieving media of the virtual holiday destination based on the virtual itinerary, wherein the media is retrieved from a social media network or a public media database, generating a virtual environment based on the media, and generating a virtual representative of a user in the virtual environment.

17 Claims, 4 Drawing Sheets

(56) References Cited

OTHER PUBLICATIONS

Bronzin et al. "Artificial Intelligence (AI) brings enhanced personalized user experience." 2021 44th International Convention on Information, Communication and Electronic Technology (MIPRO). IEEE, 2021, pp. 1231-1236.

Jang, Jong-Hwan, et al. "Deep learning approach for imputation of missing values in actigraphy data: Algorithm development study." JMIR mHealth and uHealth vol. 8, Iss. 7, e16113,(2020): 14 pages.

Virtual Vacations, "Virtual Vacations: The website that lets you experience the world from home!" https://virtualvacation.us/ (retrieved Jul. 5, 2023), 3 pages.

Anshel Sag, "HypeVR Brings Industry-First Live Real-Time Photorealistic Volumetric Video Streaming To Life", Sep. 16, 2022, 8 pages, doi: https://www.forbes.com/sites/moorinsights/2022/09/16/hypevr-brings-industry-first-live-real-time-photorealistic-volumetric-video-streaming-to-life/?sh=2be3f9044cc2.

Hermes, "Real Time Streaming within Augmented and Virtual Reality", Jun. 14, 2019, 26 pages, doi: https://medium.com/agora-io/sharing-augmented-realities-in-realtime-bfaf9d6f5283.

Lee et al., "Measurement Study of Real-Time Virtual Reality Contents Streaming over IEEE 802.11ac Wireless Links", Electronics, Aug. 15, 2021, 13 pages, vol. 10, No. 16, doi: https://www.mdpi.com/2079-9292/10/16/1967.

Thomas Cook Virtual Reality Holiday 'Try Before You Fly', Work, 4 pages, Launched in 2015, 4 pages, doi: https://visualise.com/case-study/thomas-cook-virtual-holiday.

Tom Emrich, "How Augmented Reality Will Save the Holidays for Brick-and-Mortar Retail", Adweek, 10 pages, doi: https://www.adweek.com/sponsored/how-augmented-reality-will-save-the-holidays-for-brick-and-mortar-retail/.

\* cited by examiner

VIRTUAL HOLIDAY CONTROL

BACKGROUND

The present disclosure relates to mixed reality experiences, and more specifically, to providing a virtual holiday experience using real-time and generative data.

Traditional virtual holidays involve vacation experiences that occur on the internet or in a virtual reality environment. A user may go on a virtual holiday to explore popular landmarks, attend events, and experience attractions at vacation destinations. However, traditional virtual holiday experiences do not use real-time (or recent) data, and therefore do not provide up-to-date experiences of the vacation destinations.

SUMMARY

A method is provided according to one embodiment of the present disclosure. The method includes receiving a virtual itinerary, wherein the virtual itinerary includes a virtual holiday destination and a user preference; retrieving media of the virtual holiday destination based on the virtual itinerary, wherein the media is retrieved from a social media network or a public media database; generating a virtual environment based on the media; and generating a virtual representative of a user in the virtual environment.

A system is provided according to one embodiment of the present disclosure. The system includes a processor; and memory or storage comprising an algorithm or computer instructions, which when executed by the processor, performs an operation that includes receiving a virtual itinerary, wherein the virtual itinerary includes a virtual holiday destination and a user preference; retrieving media of the virtual holiday destination based on the virtual itinerary, wherein the media is retrieved from a social media network or a public media database; generating a virtual environment based on the media; and generating a virtual representative of a user in the virtual environment.

A computer-readable storage medium having computer-readable program code embodied therewith, the computer-readable program code executable by one or more computer processors to perform an operation, is provided according to one embodiment of the present disclosure. The operation includes receiving a virtual itinerary, wherein the virtual itinerary includes a virtual holiday destination and a user preference; retrieving media of the virtual holiday destination based on the virtual itinerary, wherein the media is retrieved from a social media network or a public media database; generating a virtual environment based on the media; and generating a virtual representative of a user in the virtual environment.

DETAILED DESCRIPTION

Figure 1:
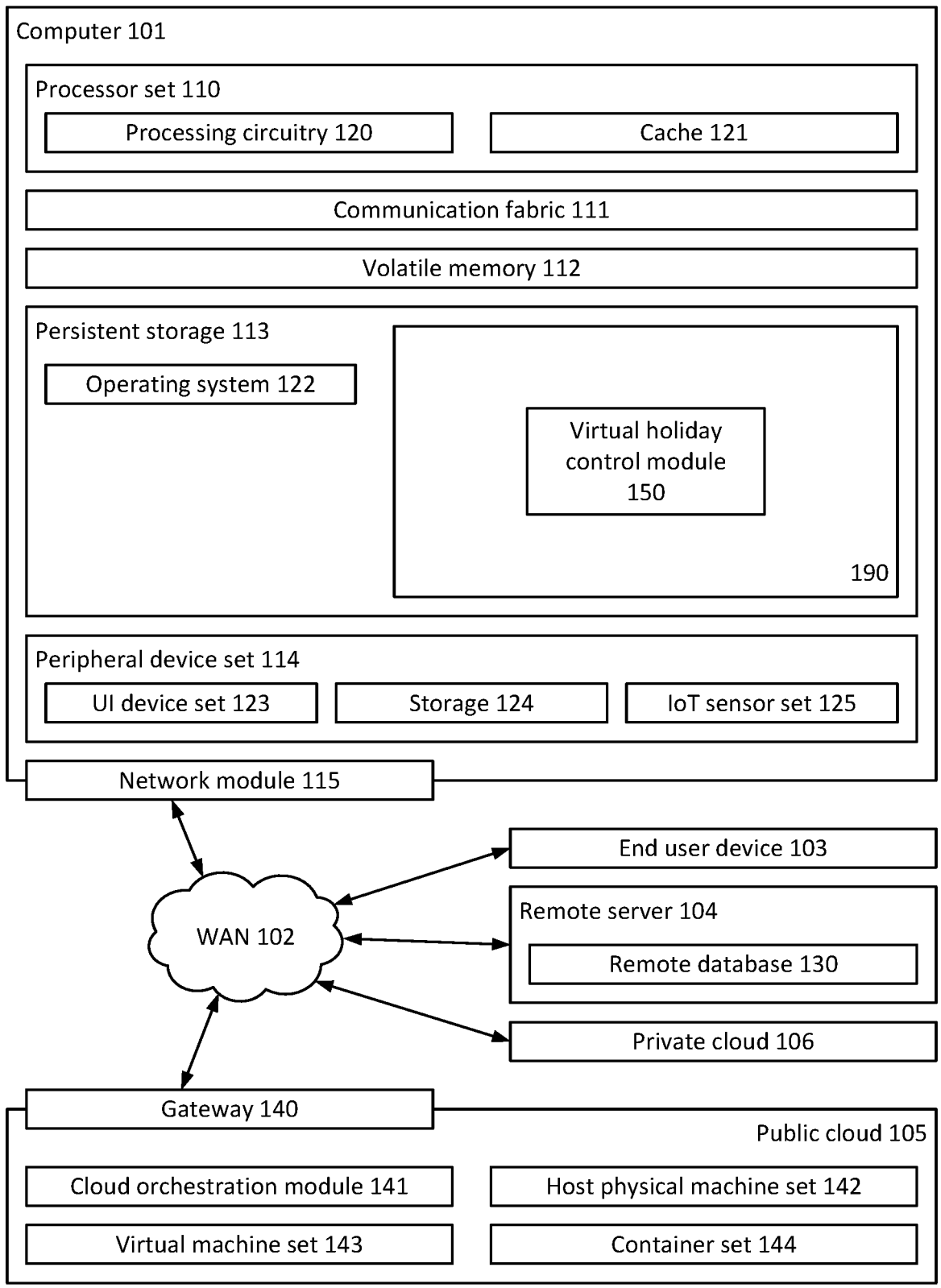
FIG. 1 illustrates a computing environment, according to one embodiment.

Embodiments of the present disclosure improve upon virtual holiday experiences by enabling real-time and up-to-date virtual recreations of destinations that account for user preferences. A user preference can represent a tourist attraction, an event, a landmark, a virtual vendor, or the like, that a user seeks to encounter during a virtual holiday experience. In one embodiment, a virtual holiday control (VHC) module generates the virtual experience using real-time and up-to-date media (e.g., videos, images, or the like) retrieved from social media networks. The VHC module can also generate features of the virtual experience using historical media data public media databases or from previous virtual holiday experiences. Further, the VHC module can generate a virtual representative of the user, which can be used to interact with the virtual environment. In one embodiment, when a user preference is unavailable in the virtual experience, the VHC module can recreate the user preference via a null-infused denoising convolutional autoencoder.

One benefit of the disclosed embodiments is to improve virtual holiday experiences by providing current and updated virtual environments. Further, embodiments of the present disclosure can improve virtual holiday experiences by catering the experiences towards user preferences.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to one embodiment. Computing environment 100 contains an example of an environment for the execution of at least some of the computer code involved in performing the inventive methods, such as a new virtual holiday control module 150, shown in block 190. In addition to block 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers.

IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
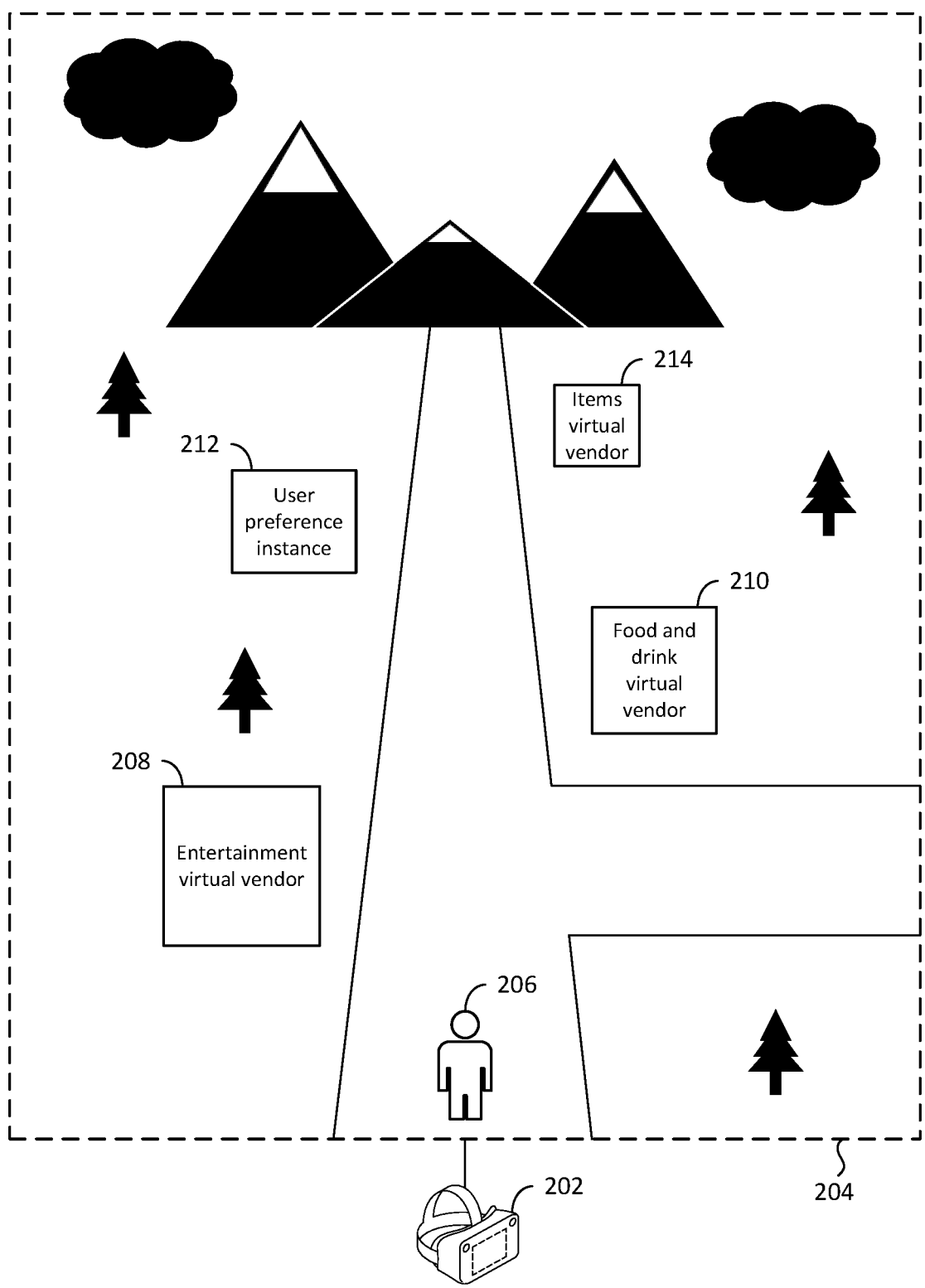
FIG. 2 illustrates a virtual holiday environment, according to one embodiment.

FIG. 2 illustrates a virtual holiday environment 200, according to one embodiment. In the illustrated embodiment, the virtual holiday environment 200 includes a headset 202 and a virtual environment 204, which includes a virtual representative 206 of a user, an entertainment virtual vendor 208, a food and drink virtual vendor 210, a user preference instance 212, and an items virtual vendor 214.

In one embodiment, the headset 202 represents a virtual reality headset, an augmented reality headset, or a mixed reality headset. The headset 202 may include, or be representative of, the computer 101 described in FIG. 1. As previously discussed, the persistent storage 113 of the computer 101 can include a virtual holiday control (VHC) module 150. In one embodiment, the VHC module 150 represents one or more algorithms, instruction sets, software applications, or other computer-readable program code that can be executed by the processor set 110 to perform the functions, operations, or processes described herein.

The headset 202 can show the virtual environment 204 via a display. The virtual environment 204 may include a virtual reality world, an augmented reality overlay of the real world, or a mixed reality depiction of a virtual holiday destination.

In one embodiment, the user completes a virtual itinerary via the headset 202. The VHC module 150 can use the virtual itinerary to determine a destination, and generate the virtual environment 204 of the destination using media (e.g., videos, image, or the like) from social media networks or public databases to generate the virtual environment 204. The VHC module 150 can also generate a virtual representative 206 of the user to explore the virtual environment 204. These processes are described in FIG. 3 below.

The virtual environment 204 can include tourist attractions, landmarks, virtual vendors, or the like. In the illustrated embodiment, the user may interact with the entertainment virtual vendor 208, the food and drink virtual vendor 210, the user preference instance 212, and the items virtual vendor 214. As used herein, a "virtual vendor" can represent a store, a seller, or a provider of goods or services that are available in the virtual environment 204.

The entertainment virtual vendor 208 can be a concert stage, a movie theater, a sports arena, or the like, at which the user can experience entertainment that is local or native to the destination. In one embodiment, when the user interacts with the entertainment virtual vendor 208, the user can experience the entertainment provided by the entertainment virtual vendor 208 via audio and visual features of the headset 202. In another embodiment, the VHC module 150 retrieves or captures the entertainment experience in a media file (e.g., a prerecorded video or audio, a live-streamed video or audio, or the like), and offers the media file to the user for download or purchase. When the user downloads or purchases the media file, the media file can be delivered to the headset 202, or delivered to the user in a physical media form (e.g., a media disc or the like).

The food and drink virtual vendor 210 can be a grocery store, a restaurant, a street food vendor, or the like, at which the user can experience food and drinks that are local or native to the destination. The items virtual vendor 214 can be a clothing shop, a general goods stores, a souvenir shop, or the like, which can allow the user to purchase items that are local or native to the destination. In one embodiment, when the user makes a purchase from the food and drink virtual vendor 210 or the items virtual vendor, the VHC module 150 routes the purchase to a physical or online vendor that is local to the user. The purchased goods can then be delivered to the user.

In one embodiment, the user preference instance 212 represents a feature of the virtual holiday experience that is catered to a preference of the user. Examples of the user preference instance 212 include attractions, events, landmarks, vendors, or the like, that provide goods, services, or experiences that may be otherwise unavailable to the user in the virtual environment. In one embodiment, the user preference instance 212 is generated based on a null-infused denoising convolutional autoencoder. This process is described in FIGS. 3-4 below.

Figure 3:
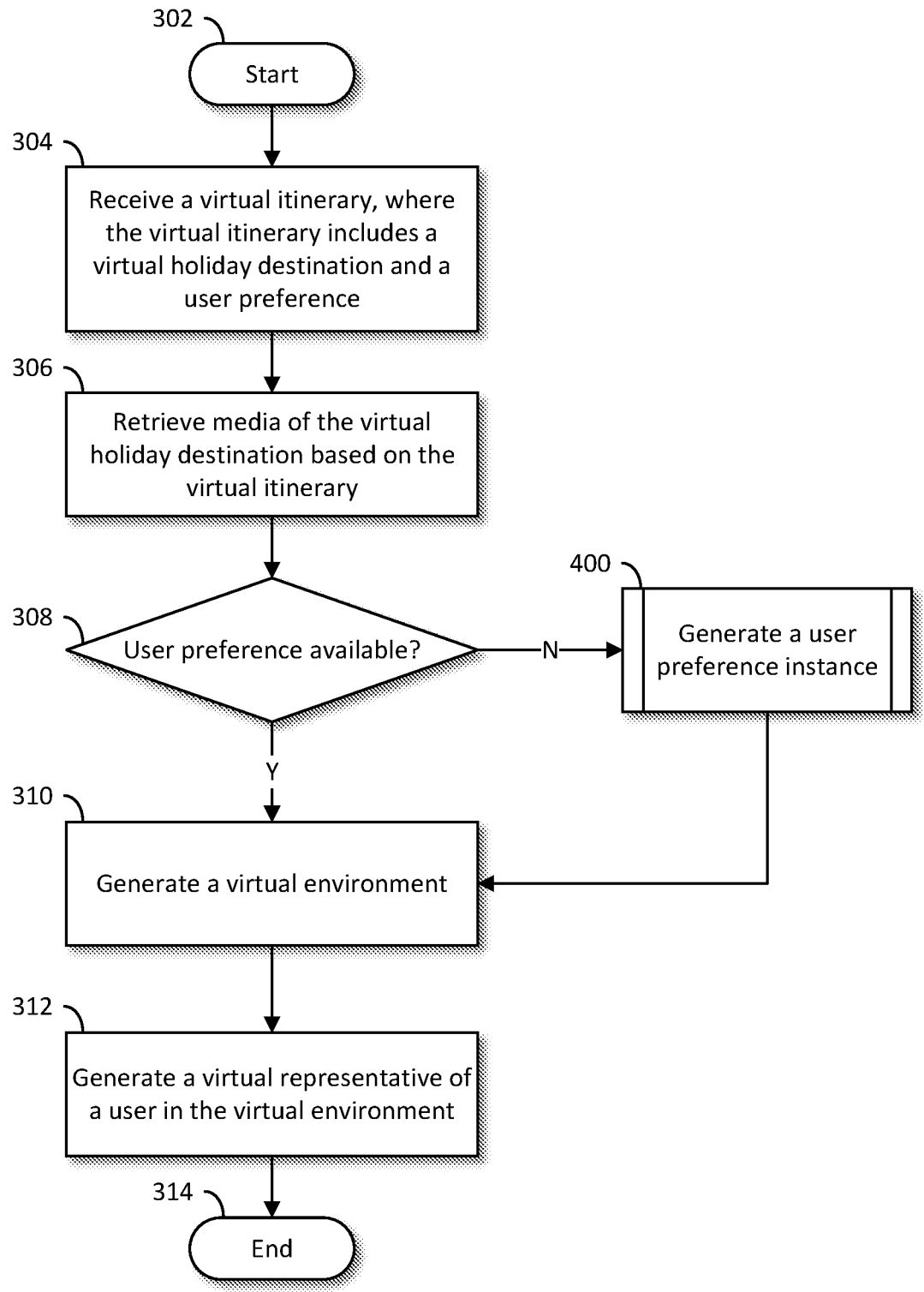
FIG. 3 illustrates a flowchart of a method of generating a virtual holiday environment, according to one embodiment.

FIG. 3 illustrates a flowchart of a method 300 of generating a virtual holiday environment 200, according to one embodiment. The method 300 begins at block 302.

At block 304, the virtual holiday control (VHC) module 150 receives a virtual itinerary, where the virtual itinerary includes a virtual holiday destination and a user preference. In one embodiment, a virtual holiday destination represents a travel location to be explored by the user during the virtual holiday experience. A user preference can represent a tourist attraction, an event, a landmark, a virtual vendor, or the like, that the user seeks to encounter during the virtual holiday experience.

As previously discussed, a virtual vendor can represent a store, a seller, or a provider of goods or services that are available in the virtual environment 204. In one embodiment, the virtual vendor may be a drink vendor (e.g., a bar), an entertainment vendor (e.g., movie theater), a food vendor (e.g., a restaurant), an item vendor (e.g., souvenir shop), or the like.

In one embodiment, the user completes the virtual itinerary via the headset 202. For example, the user can set virtual destinations and user preferences via a user profile, a travel wizard, text input fields, or the like, displayed by the headset 202. The VHC module 150 can also determine the user preferences using previous virtual holiday data of the user (e.g., data of a duration or a level of engagement with a feature of the previous virtual holiday, user preferences of the previous virtual holiday, or the like).

At block 306, the virtual holiday control module 150 retrieves media of a geographical location corresponding to the virtual holiday destination of the virtual itinerary. The VHC module 150 can retrieve real-time, or recent, videos and images of the geographical location using social media networks. Further, the VHC module 150 can retrieve the historical media data from public media databases (e.g., government websites, travel websites, or the like). In one embodiment, the VHC module 150 pulls video or image content from sources that have been vetted to ensure compliance with legal regulations in the location of the user, as well as the virtual holiday destination.

At block 308, the virtual holiday control module 150 determines whether a user preference is available. In one embodiment, a user preference is available when the VHC module 150 can match the user preference to data of the media.

In one embodiment, the VHC module 150 analyzes the media to identify features such as tourist attractions, an event, landmarks, vendors, or the like, that are present in the geographical location. Afterwards, the VHC module 150 compares the features to the user preference to determine whether a match exists.

For example, the VHC module 150 may identify markers (e.g., a portion of the signage) of a popular local restaurant in the videos or images, and compare the markers to a database that includes local business images to determine that the restaurant is present at the geographical location. Hence, when the user preference includes the restaurant name, or types of foods or drinks that are served at the restaurant, the VHC module 150 can determine that the user preference is available in the geographical location.

The VHC module 150 can also consider social media tags, social media descriptions of the geographical location, maps of the geographical location, or the like. For example, when a social media post includes a video or an image of the restaurant, along with a tag of the name of the restaurant, the VHC module 150 can compare the appearance or the name of the restaurant from the social media post to the user preference to determine whether the user preference is available.

Upon determining that the user preference is available, the method 300 proceeds to block 310. However, upon determining that the user preference is not available, the method 300 invokes another method 400 that generates a user preference instance (described in FIG. 4 below). The method 300 then proceeds to block 310.

At block 310, the virtual holiday control module 150 generates a virtual environment 204. In one embodiment, the virtual environment 204 represents a visual and audio recreation of the geographical location corresponding to the virtual holiday destination.

The virtual environment 204 can include a virtual reality world, an augmented reality overlay of the real world, or a mixed reality depiction of a virtual holiday destination. As illustrated in FIG. 2, the virtual environment 204 can include features such as landmarks, landscapes, roads, vendors, weather, or the like, that may be encountered at the geographical location.

At block 312, the virtual holiday control module 150 generates a virtual representative 206 of a user in the virtual environment. The virtual representative 206 may represent an avatar, a character design, or a 3D model of the user in the virtual environment 204. In one embodiment, the user can control the virtual representative 206 to interact with the landscape, the virtual vendors, or the like, in the virtual environment 204. The method 300 ends at block 314.

Figure 4:
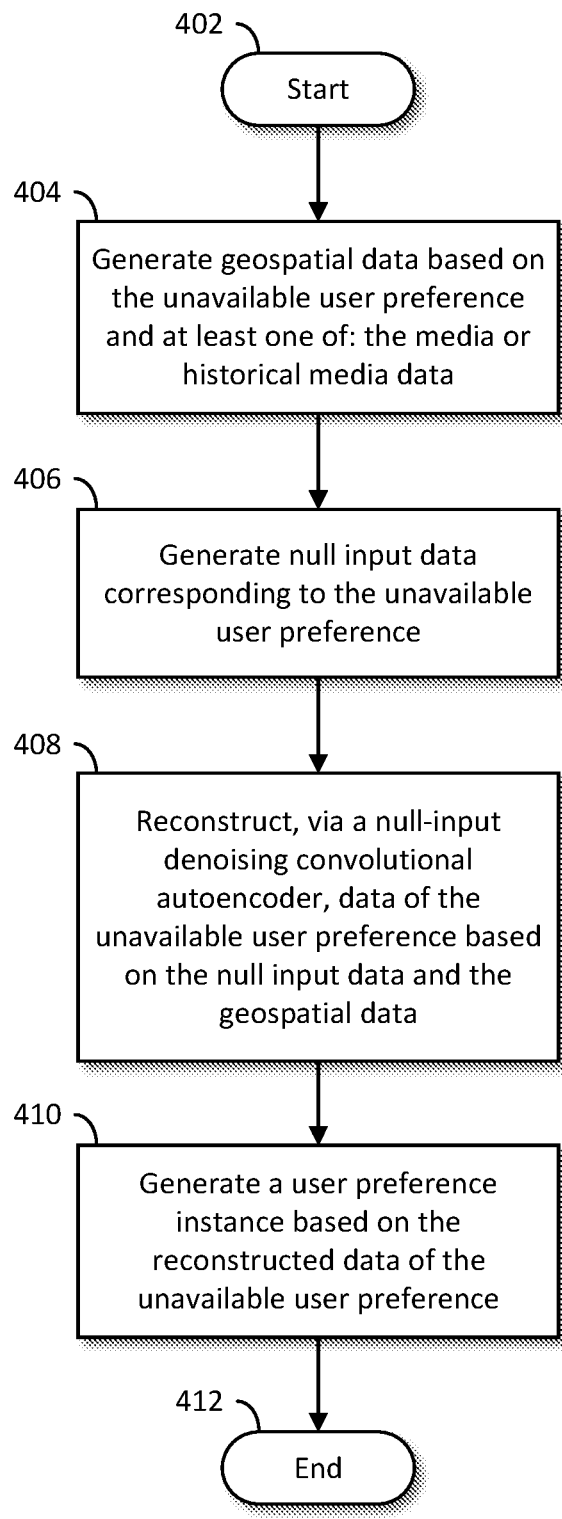
FIG. 4 illustrates a flowchart of a method of generating a user preference instance, according to one embodiment.

FIG. 4 illustrates a flowchart of a method 400 of generating a user preference instance, according to one embodiment. As previously discussed, the virtual holiday control (VHC) module 150 may perform the method 400 when the user preference is unavailable (e.g., when the VHC module 150 cannot match the user preference to data of the media corresponding to the virtual holiday destination). The method 400 begins at block 402.

At block 404, the virtual holiday control module 150 generates geospatial data based on the unavailable user preference and at least one of: the media or historical media data. In one embodiment, the geospatial data represents a location of space in the virtual environment 204 that can visually support (e.g., provide enough space to encompass) a user preference instance 212.

At block 406, the virtual holiday control module 150 generates null input data corresponding to the unavailable user preference. In one embodiment, the null input data includes a null data type or zeroed-out data.

At block 408, the virtual holiday control module 150 reconstructs, via a null input denoising convolution autoencoder, data of the unavailable user preference based on the null input data and the geospatial data. In one embodiment, the null-infused denoising convolution autoencoder is a convolutional autoencoder that receives a null input data, and the media or the historical media data, as inputs. The autoencoder then outputs a complete data set that includes the reconstructed data of the unavailable user preference in place of the null value set.

In one embodiment, the convolutional autoencoder includes an encoder, a latent space representation, and a decoder. The encoder can include convolutional layers that convolve filters over the inputs or feature maps from preceding layers to identify features of the inputs in the form of feature maps. The feature maps are further compressed into lower dimensional representations at each subsequent convolutional layer of the encoder. The output of the encoder is a latent space representation, which is a lower-dimensional representation of the input.

The decoder can include upsampling layers that perform transposed convolution operations on the latent space representation or feature maps of preceding layers to generate upsampled or less-compressed feature maps at each subsequent layer of the decoder. In one embodiment, the output of the decoder is an output data set that resembles the inputs to the encoder, but with the null input data replaced with the reconstructed data of the unavailable user preference.

At block 410, the virtual holiday control module 150 generates a user preference instance 212 based on the reconstructed data of the unavailable user preference. As previously discussed, examples of the user preference instance 212 can include attractions, events, landmarks, vendors, or the like. The user preference instance 212 can be displayed via the headset 202 as a substitute or replacement of the unavailable user preference.

For example, assuming that the unavailable user preference includes a restaurant that serves a local dish, the user preference instance 212 may be a virtual vendor with that sells the dish, or provides similar options. The method 400 ends at block 412.

While the foregoing is directed to embodiments of the present invention, other and further embodiments of the invention may be devised without departing from the basic scope thereof, and the scope thereof is determined by the claims that follow.

What is claimed is:

1. A method comprising:
receiving a virtual itinerary, wherein the virtual itinerary includes a virtual holiday destination and a user preference;
retrieving media of the virtual holiday destination based on the virtual itinerary, wherein the media is retrieved from a social media network or a public media database, the media comprising real-time geotagged imagery or video from social media networks corresponding to the virtual holiday destination;
generating a virtual environment based on the media, wherein the virtual environment is generated based on the real-time geotagged imagery or video;
generating a virtual representative of a user in the virtual environment;
upon determining that the user preference is unavailable, wherein the user preference is deemed unavailable when no feature in the retrieved media matches the user preference, generating geospatial data based on the unavailable user preference and at least one of: the media or historical media data, wherein the geospatial data represents a location of space in the virtual environment that can visually support a user preference instance and comprises geographic coordinates or map metadata extracted from the media or historical media data;
generating null input data corresponding to the unavailable user preference, wherein the null input data comprises a zero-valued placeholder tensor that substitutes for missing media features associated with the unavailable user preference;
reconstructing, via a null-infused denoising convolutional autoencoder, data of the unavailable user preference based on the null input data and the geospatial data; and
generating a user preference instance based on the reconstructed data of the unavailable user preference, wherein the user preference instance is a synthesized virtual representation that substitutes for the unavailable user preference, wherein the virtual environment is further generated based on the user preference instance.

2. The method of claim 1, wherein the media retrieved from the social media network includes real-time video or images, and wherein the media retrieved from the public media database includes historical video and images.

3. The method of claim 1, wherein the user preference represents at least one of: a tourist attraction, an event, a landmark, or a virtual vendor, and wherein the user preference is determined based on at least one of: a previous user preference of a previous virtual holiday, a user engagement with feature of the previous virtual holiday, a user profile, a travel wizard, or a text input field.

4. The method of claim 1, wherein the virtual environment includes a virtual vendor; wherein the virtual vendor represents a store, a seller, or a provider of goods or services available in the virtual environment; and wherein the virtual vendor is configured to:
  receive a purchase order;
  identify a local vendor corresponding to the virtual vendor, wherein the local vendor can provide a good, service, or experience associated with the virtual vendor or the purchase order; and
  processing the purchase order via a vendor that is local to the user, wherein the purchase is routed to a physical or online vendor that is geographically local to the user for fulfillment and delivery.

5. The method of claim 1, wherein the user preference instance represents an attraction, an event, a landmark, or a vendor that can serve as a substitute or replacement of the user preference, and wherein the user preference instance is displayed as a substitute or replacement of the unavailable user preference.

6. The method of claim 1, wherein the virtual representative represents an avatar, a character design, or a 3D model of the user in the virtual environment, and wherein the virtual representative can interact with a feature of the virtual environment.

7. A system, comprising:
  a processor; and
  memory or storage comprising an algorithm or computer instructions, which when executed by the processor, performs an operation comprising:
  receiving a virtual itinerary, wherein the virtual itinerary includes a virtual holiday destination and a user preference;
  retrieving media of the virtual holiday destination based on the virtual itinerary, wherein the media is retrieved from a social media network or a public media database, the media comprising real-time geotagged imagery or video from social media networks corresponding to the virtual holiday destination;
  generating a virtual environment based on the media, wherein the virtual environment is generated based on the real-time geotagged imagery or video;
  generating a virtual representative of a user in the virtual environment;
  upon determining that the user preference is unavailable, wherein the user preference is deemed unavailable when no feature in the retrieved media matches the user preference, generating geospatial data based on the unavailable user preference and at least one of: the media or historical media data, wherein the geospatial data represents a location of space in the virtual environment that can visually support a user preference instance and comprises geographic coordinates or map metadata extracted from the media or historical media data;
  generating null input data corresponding to the unavailable user preference, wherein the null input data comprises a zero-valued placeholder tensor that substitutes for missing media features associated with the unavailable user preference;
  reconstructing, via a null-infused denoising convolutional autoencoder, data of the unavailable user preference based on the null input data and the geospatial data; and
  generating a user preference instance based on the reconstructed data of the unavailable user preference, wherein the user preference instance is a synthesized virtual representation that substitutes for the unavailable user preference, wherein the virtual environment is further generated based on the user preference instance.

8. The system of claim 7, wherein the media retrieved from the social media network includes real-time video or images, and wherein the media retrieved from the public media database includes historical video and images.

9. The system of claim 7, wherein the user preference represents at least one of: a tourist attraction, an event, a landmark, or a virtual vendor, and wherein the user preference is determined based on at least one of: a previous user preference of a previous virtual holiday, a user engagement with feature of the previous virtual holiday, a user profile, a travel wizard, or a text input field.

10. The system of claim 7, wherein the virtual environment includes a virtual vendor, wherein the virtual vendor represents a store, a seller, or a provider of goods or services available in the virtual environment; and wherein the virtual vendor is configured to:
  receive a purchase order;
  identify a local vendor corresponding to the virtual vendor, wherein the local vendor can provide a good, service, or experience associated with the virtual vendor or the purchase order; and
  processing the purchase order via a vendor that is local to the user, wherein the purchase is routed to a physical or online vendor that is geographically local to the user for fulfillment and delivery.

11. The system of claim 7, wherein the user preference instance represents an attraction, an event, a landmark, or a vendor that can serve as a substitute or replacement of the user preference, and wherein the user preference instance is displayed as a substitute or replacement of the unavailable user preference.

12. The system of claim 7, wherein the virtual representative represents an avatar, a character design, or a 3D model of the user in the virtual environment, and wherein the virtual representative can interact with a feature of the virtual environment.

13. A computer-readable storage medium having a computer-readable program code embodied therewith, the computer-readable program code executable by one or more computer processors to perform an operation comprising:
  receiving a virtual itinerary, wherein the virtual itinerary includes a virtual holiday destination and a user preference;
  retrieving media of the virtual holiday destination based on the virtual itinerary, wherein the media is retrieved from a social media network or a public media database, the media comprising real-time geotagged imagery or video from social media networks corresponding to the virtual holiday destination;

generating a virtual environment based on the media, wherein the virtual environment is generated based on the real-time geotagged imagery or video;

generating a virtual representative of a user in the virtual environment;

upon determining that the user preference is unavailable, wherein the user preference is deemed unavailable when no feature in the retrieved media matches the user preference, generating geospatial data based on the unavailable user preference and at least one of: the media or historical media data, wherein the geospatial data represents a location of space in the virtual environment that can visually support a user preference instance and comprises geographic coordinates or map metadata extracted from the media or historical media data;

generating null input data corresponding to the unavailable user preference, wherein the null input data comprises a zero-valued placeholder tensor that substitutes for missing media features associated with the unavailable user preference;

reconstructing, via a null-infused denoising convolutional autoencoder, data of the unavailable user preference based on the null input data and the geospatial data; and generating a user preference instance based on the reconstructed data of the unavailable user preference, wherein the user preference instance is a synthesized virtual representation that substitutes for the unavailable user preference, wherein the virtual environment is further generated based on the user preference instance.

14. The computer-readable storage medium of claim 13, wherein the media retrieved from the social media network includes real-time video or images, and wherein the media retrieved from the public media database includes historical video and images.

15. The computer-readable storage medium of claim 13, wherein the user preference represents at least one of: a tourist attraction, an event, a landmark, or a virtual vendor, and wherein the user preference is determined based on at least one of: a previous user preference of a previous virtual holiday, a user engagement with feature of the previous virtual holiday, a user profile, a travel wizard, or a text input field.

16. The computer-readable storage medium of claim 13, wherein the virtual environment includes a virtual vendor; wherein the virtual vendor represents a store, a seller, or a provider of goods or services available in the virtual environment; and wherein the virtual vendor is configured to:

receive a purchase order;

identify a local vendor corresponding to the virtual vendor, wherein the local vendor can provide a good, service, or experience associated with the virtual vendor or the purchase order; and processing the purchase order via a vendor that is local to the user, wherein the purchase is routed to a physical or online vendor that is geographically local to the user for fulfillment and delivery.

17. The computer-readable storage medium of claim 13, wherein the user preference instance represents an attraction, an event, a landmark, or a vendor that can serve as a substitute or replacement of the user preference, and wherein the user preference instance is displayed as a substitute or replacement of the unavailable user preference.

* * * * *